Dec. 1, 1959 W. C. DERSCH, JR 2,915,677

GAS TUBE PULSE GENERATOR

Filed Dec. 26, 1952 2 Sheets-Sheet 1

INVENTOR
WILLIAM C. DERSCH, JR.
BY Jahn P. Dainty
ATTORNEY

Dec. 1, 1959 W. C. DERSCH, JR 2,915,677

GAS TUBE PULSE GENERATOR

Filed Dec. 26, 1952 2 Sheets-Sheet 2

INVENTOR.
WILLIAM C. DERSCH, JR.
BY John P. Doity
ATTORNEY

United States Patent Office 2,915,677
Patented Dec. 1, 1959

2,915,677

GAS TUBE PULSE GENERATOR

William C. Dersch, Jr., Vestal, N.Y., assignor to International Business Machines Corporation, New York, N.Y., a corporation of New York Application December 26, 1952, Serial No. 327,961

1 Claim. (Cl. 315—273)

This invention relates to pulse generators and more particularly to pulse generators employing gas filled tubes.

It is an object of this invention to provide an improved pulse generator of low output impedance.

Another object of this invention is to provide an improved pulse generator wherein the repetition rate of the generated pulses may be easily controlled.

Another object of this invention is to provide an improved pulse generator for generating accurately shaped pulses wherein the repetition rate of the generated pulses may be easily varied without changing their shape or amplitude.

A further object of this invention is to provide a simplified pulse generator for generat'ng a linear saw-tooth shaped pulse wherein the slope of the pulse may be easily controlled.

Another object of this invention is to provide an improved pulse generator for driving a load wherein the full voltage of the pulse generator power supply may be applied to said load.

Other objects of the invention will be pointed out in the following description and claim and illustrated in the accompanying drawings, which disclose, by way of example, the principle of the invention and the best mode, which has been contemplated, of applying that principle.

Figure 1:
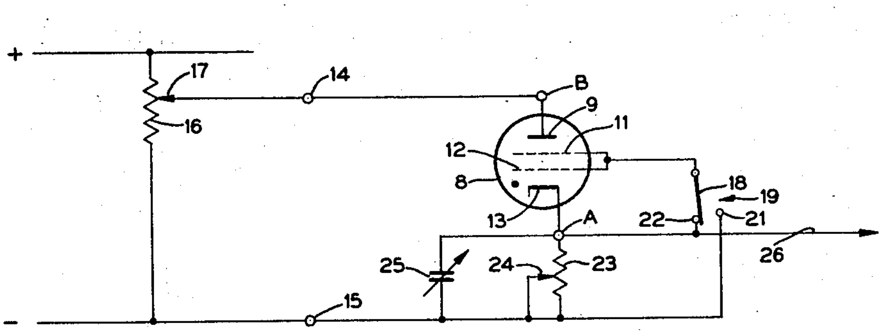
Fig. 1 is a schematic circuit diagram of a pulse generator made in accordance with this invention.

Referring to Fig. 1 there is illustrated a pulse generator including a gas filled tube 8, shown as being of the dual grid thyratron type. Tube 8 includes an anode 9, grids 11 and 12 and a cathode 13. A source of voltage including terminals 14 and 15 and a potentiometer 16 may be provided to supply power to the pulse generator. Potentiometer 16 is provided with a slider 17 which may be moved to vary the voltage at terminal 14. Anode 9 of tube 8 is connected to terminal 14 of the power supply. Grids 11 and 12 of tube 8 are connected together and both connected to the movable arm 18 of a switch 19. Switch 19 is provided with a contact 21 connected to terminal 15 of the source of voltage, and a contact 22 connected to cathode 13 of tube 8. By moving arm 18, the grids 11 and 12 may be connected to either cathode 13 of tube 8 or terminal 15 of the source of voltage.

A potentiometer 23 having a slider 24 is connected between cathode 13 of tube 8 and terminal 15 of the source of voltage. By moving slider 24, the resistance between cathode 13 and terminal 15 may be varied. A variable capacitor 25 is connected in parallel with potentiometer 24, and any suitable means, not shown, may be provided to vary the value of this capacitor.

An output circuit is provided for the pulse generator, from an output terminal A connected to cathode 13 of tube 8, over line 26.

In operation, arm 18 of switch 19 is positioned to connect grids 11 and 12 to cathode 13 of tube 8. With this arrangement the pulse generator will generate uniform pulses at a rate determined by the characteristics of tube 8 and the current through tube 8.

Figure 5:
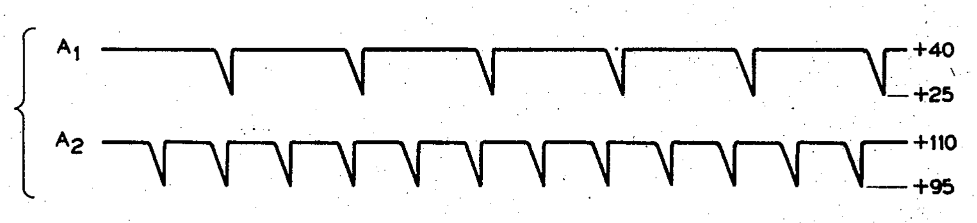
Fig. 5 is a graphical representation, to a common time base, of approximate voltage wave forms occurring at the output of the pulse generator shown in Fig. 1.

Referr'ng to the wave form at A1 in Fig. 5 there are shown uniform pulses which appear at terminal A of Fig. 1. For example, this wave form might occur at terminal A with terminal 15 grounded and a +40 volt potential applied to anode 9 of tube 8. Potentiometer 23 might be set to offer a resistance of 500 ohms and capacitor 25 set at .1 micro-farad to produce the wave forms of Fig. 5. The repetitive rate of these pulses may be changed by moving slider 17 of potentiometer 16 to vary the potential at anode 9 of tube 8, as shown at A2 in Fig. 5. For example, the wave form at A2 in Fig. 5 might occur at terminal A with a +110 volt potential applied to anode 9 of tube 8. It is to be noted that the pulses at A1 in Fig. 5 are of the same shape as, and of equal magnitude to, the pulses shown at A2.

The voltage at the cathode of tube 8 approaches very nearly the anode potential, as demonstrated by the wave forms of Fig. 5. The negative-going pulses of the output go from the voltage of the power supply to a voltage of approximately 15 volts below the voltage of the power supply in the example of Fig. 5. The full voltage of the power supply is thus applied across a driven load.

Figure 6:
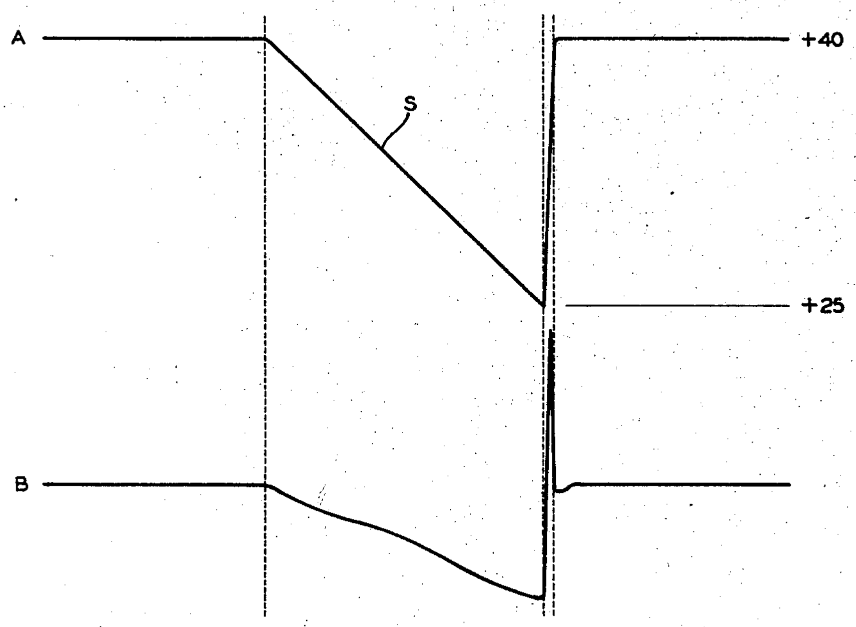
Fig. 6 is a graphical representation, to a common time base, of approximate wave forms which exist in various portions of the circuit of Fig. 1, these portions being designated by the same alphabetic characters as the corresponding wave forms.

Referring to Fig. 6 there is shown at A the approximate voltage wave form appearing at terminal A in Fig. 1, to a larger scale than is shown in Fig. 5. The slope of a pulse in this wave form, shown as S in Fig. 6, may be varied by varying the value of the resistance between cathode 13 of tube 8 of Fig. 1 and terminal 15, or by varying the value of capacitor 25, or by varying both. Varying the slope S of a pulse, as shown at A in Fig. 6, will not appreciably vary the voltage magnitude of the pulse. There is shown at B in Fig. 5 the approximate current wave form appearing on terminal B at anode 9 of tube 8 of Fig. 1. This current wave form is on the same time scale as the voltage wave form shown at A and represents the current through tube 8. The relatively linear drop in current through tube 8 while cathode 13 of tube 8 is dropping in voltage, under the influence of the parallel arranged capacitor 25 and potentiometer 24, produces the relatively linear slope, shown as S in Fig. 6. By positioning arm 18 of switch 19 to connect grids 11 and 12 to terminal 15, tube 8 may be cut off and the generation of pulses terminated. A pulse generator of simple construction is thus provided for producing relatively linear saw-tooth voltage pulses. The time between successive pulses may be easily controlled and the slope of the pulses may also be easily controlled. It is to be pointed out that any stray external capacitance around the gas tube of the pulse generator is so insignificant as to have no noticeable effect on the wave forms shown in Figs. 5 and 6. Thus, it may be said that there is no substantial external capacitance between the anode and cathode of the gas tube utilized in a pulse generator constructed as described above.

Figure 2:
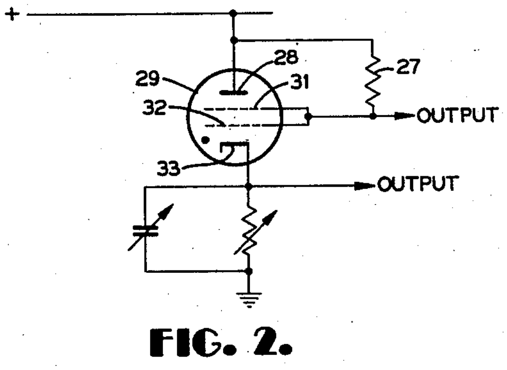
Fig. 2 is a modification of the pulse generator shown in Fig. 1.

Referring to Fig. 2 there is shown a modification of the pulse generator shown in Fig. 1. Here, a resistor 27 is provided between anode 28 of a gas filled tube 29 and the grids 31 and 32 of the tube. An output from the pulse generator may be taken from either the cathode 33 of tube 29 or from grids 31 and 32. The wave forms at these two outputs are quite similar, and may be substantially as shown in Fig. 5.

Figure 3:
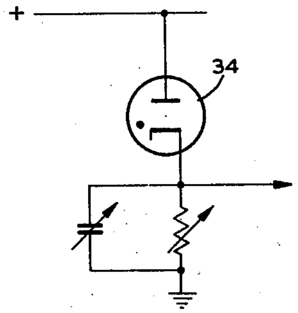
Fig. 3 is another modification of the pulse generator shown in Fig. 1.

Fig. 3 shows another modification of the pulse generator shown in Fig. 1 wherein a gas filled tube 34 having only two electrodes is utilized.

Figure 4:
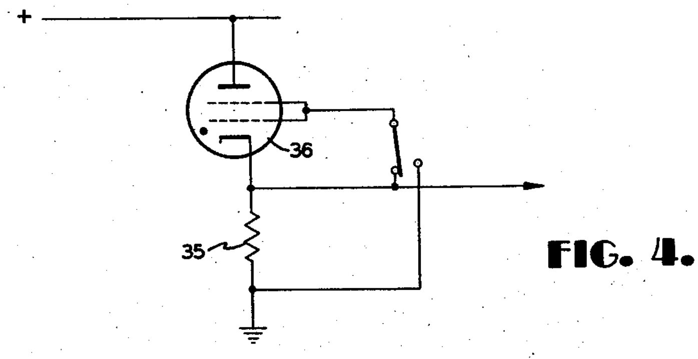
Fig. 4 is still another modification of the pulse generator shown in Fig. 1.

Fig. 4 shows a still further modification of the pulse generator shown in Fig. 1 wherein only a resistor 35 is provided in the cathode circuit of the gas filled tube 36. Gas filled tube 36, for example, may be a thyratron of the 2D21 type which has an internal cathode capacitance in the order of 6 micromicrofarads.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A pulse generator consisting of the combination of: a source of voltage having first and second terminals; a gas filled tube having an anode connected to said first terminal, a cathode and a grid; a cathode circuit including a resistor and capacitor arranged in parallel and connected between said cathode and said second terminal; and switching means for connecting said grid to said cathode for causing said pulse generator to generate pulses and for connecting said grid to said second terminal to terminate the generation of pulses by said pulse generator.

References Cited in the file of this patent

UNITED STATES PATENTS

| | | |
|---|---|---|
| 1,446,247 | DeForest | Feb. 20, 1923 |
| 1,926,181 | Schramm | Sept. 12, 1933 |
| 2,152,822 | Schlesinger | Apr. 4, 1939 |
| 2,372,005 | Kinsman | Mar. 20, 1945 |
| 2,462,945 | Carlson | Mar. 1, 1949 |
| 2,499,613 | Thompson | Mar. 7, 1950 |
| 2,552,884 | Cannon | May 15, 1951 |
| 2,578,043 | Christy | Dec. 11, 1951 |
| 2,632,846 | Hornfeck | Mar. 24, 1953 |
| 2,694,145 | Christian | Nov. 9, 1954 |
| 2,700,742 | Friend | Jan. 25, 1955 |
| 2,711,494 | Westerfield | June 21, 1955 |
| 2,725,475 | Hurford | Nov. 29, 1955 |

FOREIGN PATENTS

| | | |
|---|---|---|
| 635,353 | France | Mar. 14, 1928 |
| 686,783 | Germany | Jan. 16, 1940 |